US008175575B2

(12) United States Patent
Cai et al.

(10) Patent No.: US 8,175,575 B2
(45) Date of Patent: May 8, 2012

(54) ONLINE CHARGING FOR ROAMING USERS IN A PROXY ONLINE CHARGING SYSTEM OF A VISITED NETWORK

(75) Inventors: Yigang Cai, Naperville, IL (US); Chung-Zin Liu, Naperville, IL (US)

(73) Assignee: Alcatel Lucent, Paris (FR)

( * ) Notice: Subject to any disclaimer, the term of this patent is extended or adjusted under 35 U.S.C. 154(b) by 1057 days.

(21) Appl. No.: 12/104,145

(22) Filed: Apr. 16, 2008

(65) Prior Publication Data
US 2009/0264096 A1 Oct. 22, 2009

(51) Int. Cl.
*H04M 11/00* (2006.01)
*H04W 4/00* (2009.01)
(52) U.S. Cl. .............. 455/406; 455/405; 455/432.1
(58) Field of Classification Search .......... 455/405–406, 455/432.1
See application file for complete search history.

(56) References Cited

U.S. PATENT DOCUMENTS

| | | | |
|---|---|---|---|
| 2004/0132449 A1* | 7/2004 | Kowarsch | 455/432.1 |
| 2007/0036312 A1* | 2/2007 | Cai et al. | 379/126 |
| 2007/0111705 A1* | 5/2007 | Zhang et al. | 455/405 |
| 2008/0046963 A1* | 2/2008 | Grayson et al. | 726/1 |
| 2008/0137592 A1* | 6/2008 | Ahmavaara et al. | 370/328 |
| 2008/0205381 A1* | 8/2008 | Zhu et al. | 370/352 |
| 2008/0229385 A1* | 9/2008 | Feder et al. | 726/1 |
| 2009/0163172 A1* | 6/2009 | Tornkvist et al. | 455/406 |

FOREIGN PATENT DOCUMENTS

| | | | |
|---|---|---|---|
| WO | WO9930480 A1 | | 6/1999 |
| WO | WO03025809 A2 | | 3/2003 |
| WO | WO 2007113383 A1 | * | 10/2007 |
| WO | WO 2008068121 A2 | * | 6/2008 |

OTHER PUBLICATIONS

3GPP TR 32.820 V8.0.1 © 2007, 3GPP Organizational Partners, All rights reserved.
"Digital cellular telecommunications system (Phase 2+); Universal Mobile Telecommunications System (UMTS); Policy and charging control architecture (3GPP ITS 23.203 version 7.6.0 Release 7); ETSI TS 123 203" ETSI Standards, LIS, Sophia Antipolis Cedex, France, vol. 3-SA2, No. V7.6.0, Apr. 2008, XP014041645.

* cited by examiner

*Primary Examiner* — Nick Corsaro
*Assistant Examiner* — Tangela T. Chambers
(74) *Attorney, Agent, or Firm* — Duft Bornsen & Fishman LLP

(57) ABSTRACT

Communication networks and methods are disclosed for performing online charging credit control in a visited network when a user is roaming. The visited network which is providing service to a roaming user includes a proxy online charging system (OCS) that communicates with a home OCS in a home network of the user. The proxy OCS transmits an online charging request message to a home OCS in a home network for the roaming user requesting charging information for the roaming user. The proxy OCS receives an online charging response message from the home OCS that includes the charging information for the roaming user. The proxy OCS then processes the charging information to perform credit control for one or more network elements in the visited network that is serving the session.

18 Claims, 6 Drawing Sheets

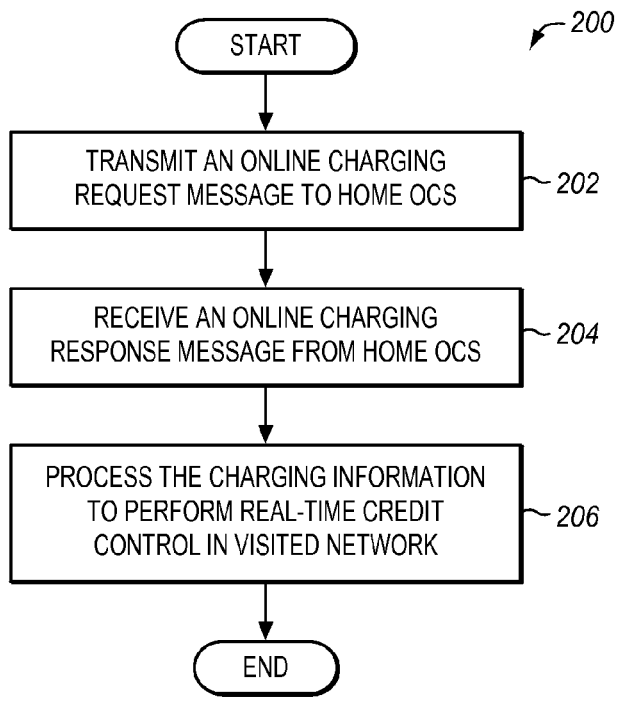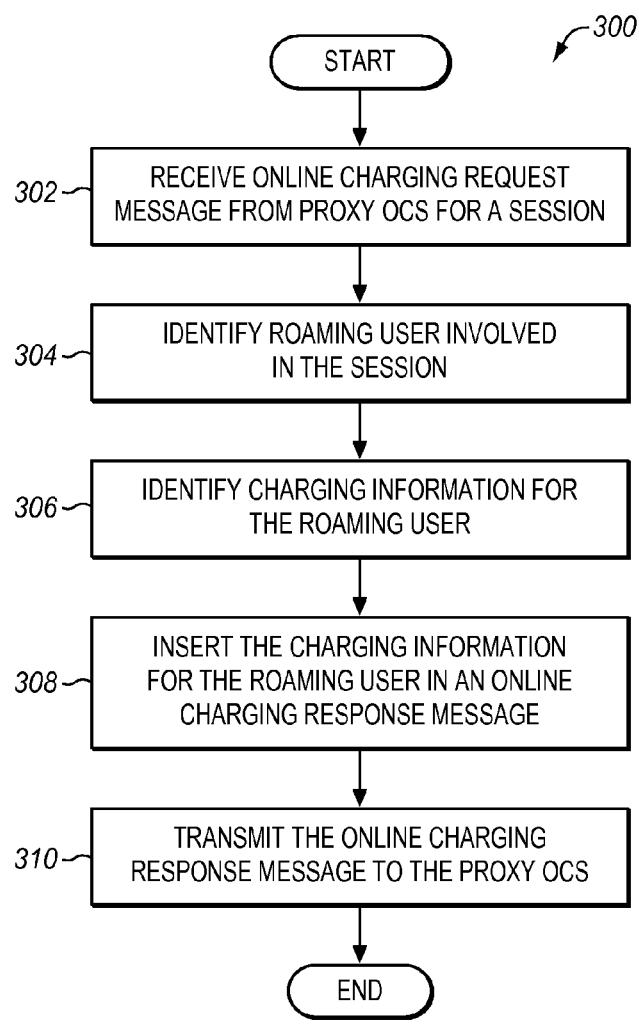

ONLINE CHARGING FOR ROAMING USERS IN A PROXY ONLINE CHARGING SYSTEM OF A VISITED NETWORK

BACKGROUND OF THE INVENTION

1. Field of the Invention

The invention is related to the field of communication networks and, in particular, to performing online charging in a proxy online charging system (OCS) of a visited network that is serving roaming users.

2. Statement of the Problem

Service providers typically provide numerous voice and/or data services to subscribers using one or more wireline and/or wireless communication networks. Exemplary services include cellular telephony, access to the Internet, gaming, broadcasting or multicasting of audio, video, and multimedia programming, etc. Mobile devices, such as cell phones, personal data assistants, smart phones, pagers, text messaging devices, global positioning system (GPS) devices, network interface cards, notebook computers, and desktop computers, may access the services provided by the communication networks over an air interface with one or more base stations. Communication between the mobile devices and base stations are governed by various standards and/or protocols, such as the standards and protocols defined by the 3rd Generation Partnership Project (3GPP, 3GPP2).

The service providers use offline and online billing functions to keep track of the charges incurred by each device for using the various services. The 3GPP/3GPP2 standards groups have defined a set of specifications that may be used to implement online charging systems and offline charging systems to cover charging in the various network domains (e.g., a circuit switching network domain, a packet switching network domain, and/or a wireless domain), IP multimedia subsystems, and emerging 3G/OMA application services.

Online charging is generally defined as a charging mechanism where charging information can affect, in real-time, the service rendered, and therefore a direct interaction of the charging mechanism with session/service control is needed. In online charging, charging information for network resource usage is collected concurrently with the resource usage. However, authorization for the network resource usage must be obtained by the network prior to the actual resource usage. The network elements in a communication network include Charging Trigger Functions (CTF). For online charging, the CTF triggers on charging events, collects charging information pertaining to the charging events, and assembles the charging information into matching charging events. The CTF then transmits credit request messages to the Online Charging System (OCS) to obtain authorization for the charging event/network resource usage requested by the user. The CTF delays the actual resource usage until permission has been granted by the OCS. When a granted quota of service units is obtained from the OCS, the CTF performs budget control during the resource usage. The CTF enforces termination of the end user's resource usage when permission by the OCS is not granted or expires.

Mobile communications allow for a mobile user to roam among networks. Roaming is a general term in mobile communications that refers to the extending of service in a location that is different from the home location where the service was registered. The term "roaming" originates from the GSM world where roaming is defined as the ability for a cellular customer to automatically make and receive voice calls, send and receive data, or access other services when traveling outside the geographical coverage area of the home network by means of using a visited network.

One type of communication network that allows for mobile communications is a cellular network. If a mobile user roams into a visited cellular network, such as a GSM network or a CDMA network, the Mobile Switching Center (MSC) in the visited cellular network serves calls for the roaming user. If a call is placed by the roaming user, the serving MSC collects online charging information for the call, and transmits the online charging information to the home MSC in the home cellular network. The home MSC then interfaces with the prepaid charging system (usually a Service Control Point (SCP)) for real-time credit control for the call.

Another type of communication network that allows for mobile communications is an IP Multimedia Subsystem (IMS) network. Before a communication device receives service from an IMS network, the communication device (commonly referred to as user equipment (UE)) attempts to register with the IMS network. To register according to 3GPP standards, the communication device transmits a register request message, such as a SIP REGISTER message, to a Proxy-Call Session Control Function (P-CSCF) through the appropriate access network. The P-CSCF identifies the home IMS network for the communication device, and then transmits another register request message to a Serving-Call Session Control Function (S-CSCF) in the home IMS network of the user. Responsive to the register request message, the S-CSCF authenticates the user, and provides session control for any session involving the user.

When a mobile user is roaming in the service area of a visited IMS network, the visited IMS network does not provide session control. If a roaming session is initiated, then the P-CSCF in the visited IMS network receives a session initiation message for the session (e.g., SIP INVITE message). The P-CSCF proxies the session control for the session to the S-CSCF in the home IMS network of the mobile user by forwarding the session initiation message to the S-CSCF. The S-CSCF in the home IMS network then provides session control for the session.

While providing session control, the S-CSCF in the home IMS network also provides charging control. The P-CSCF or the S-CSCF in the visited IMS network will route SIP messages to the home S-CSCF responsive to which the home S-CSCF will query the home online charging system (OCS) via Diameter Ro protocol to perform online charging for roaming sessions.

Other types of networks are being developed to provide voice and data communications for mobile users. One present project within the 3GPP is the Long Term Evolution (LTE) which is a project to improve the UMTS mobile phone standard to cope with future requirements. The architecture defined by this project is referred to as the Evolved Packet System (EPS). The EPS architecture comprehends E-UTRAN (Evolved UTRAN) on the access side and EPC (Evolved Packet Core) on the core side.

For a roaming case, the network elements in LTE/EPC networks, such as the serving gateway (SGW), the Packet Data Network gateway (PDN-GW), the HRPD Serving gateway (HSGW), or a AAA proxy server, are located in the visited network. Also, according to existing standards and practices, the OCS is always located in the home network even when the subscriber roams to a visited network. For example, the technical specification 3GPP TS 32.820 describes the online charging architecture for an EPC network. This technical specification describes the OCS always located in the home network.

One problem in LTE/EPC networks is that the network elements in the visited network need to interface with the home OCS to perform online charging for the roaming sessions. Interfacing with the home OCS may be impractical due to signaling security, delay issues, and other issues. Thus, it would be desirable to develop an improved manner of performing online charging for roaming sessions in LTE/EPC networks.

SUMMARY OF THE SOLUTION

Embodiments of the invention solve the above and other related problems with a new LTE/EPC online charging architecture that introduces a proxy OCS in the visited network. The proxy OCS interfaces with the home OCS to retrieve charging information for a roaming user, and then provides credit control in the visited network for sessions involving the roaming user. In providing credit control, the proxy OCS may receive an allotment of service units for the roaming user, determine a rating for a session, and grant quotas of service units to one or more network elements in the visited network that are serving the session. Advantageously, credit control for online charging is performed in the visited network and not the home network, which avoids the problems associated with having the home OCS perform credit control for roaming sessions.

In one embodiment, a visited network that is providing service to a roaming user is operable to perform real-time credit control for a session. To perform credit control, the visited network includes a proxy online charging system (OCS) that communicates with a home OCS in a home network of the user. The proxy OCS transmits an online charging request message to the home OCS requesting charging information for the roaming user. The proxy OCS receives an online charging response message from the home OCS that includes the charging information for the roaming user, such as information on the subscriber profile of the user, an allotment of service units for the user, or other information used to generate a rating for the session or for performing credit control in the visited network. The proxy OCS then processes the charging information to perform credit control for one or more network elements in the visited network that is serving the session. To perform credit control, the proxy OCS may process the charging information to identify an allotment of service units granted by the home OCS. The proxy OCS may then determine a rating for the session, and grant a quota of service units to the network elements in the visited network based on the allotment of service units and the rating.

If the allotment of service units expires in the proxy OCS, then the proxy OCS may transmit another online charging request message to the home OCS requesting a new allotment of service units. The proxy OCS receives another online charging response message from the home OCS, and processes the online charging response message to determine if a new allotment of service units was granted by the home OCS. If a new allotment was granted, then the proxy OCS may grant new quotas of service units to the network elements in the visited network. If a new allotment was not granted, then the proxy OCS may request that the user replenish his/her account in the home OCS.

The invention may include other exemplary embodiments described below.

DESCRIPTION OF THE DRAWINGS

The same reference number represents the same element or same type of element on all drawings.

FIG. 2 is a flow chart illustrating a method of performing credit control in a visited network in an exemplary embodiment of the invention.

FIG. 3 is a flow chart illustrating a method of providing charging information to a proxy OCS in an exemplary embodiment of the invention.

DETAILED DESCRIPTION OF THE INVENTION

FIGS. 1-8 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
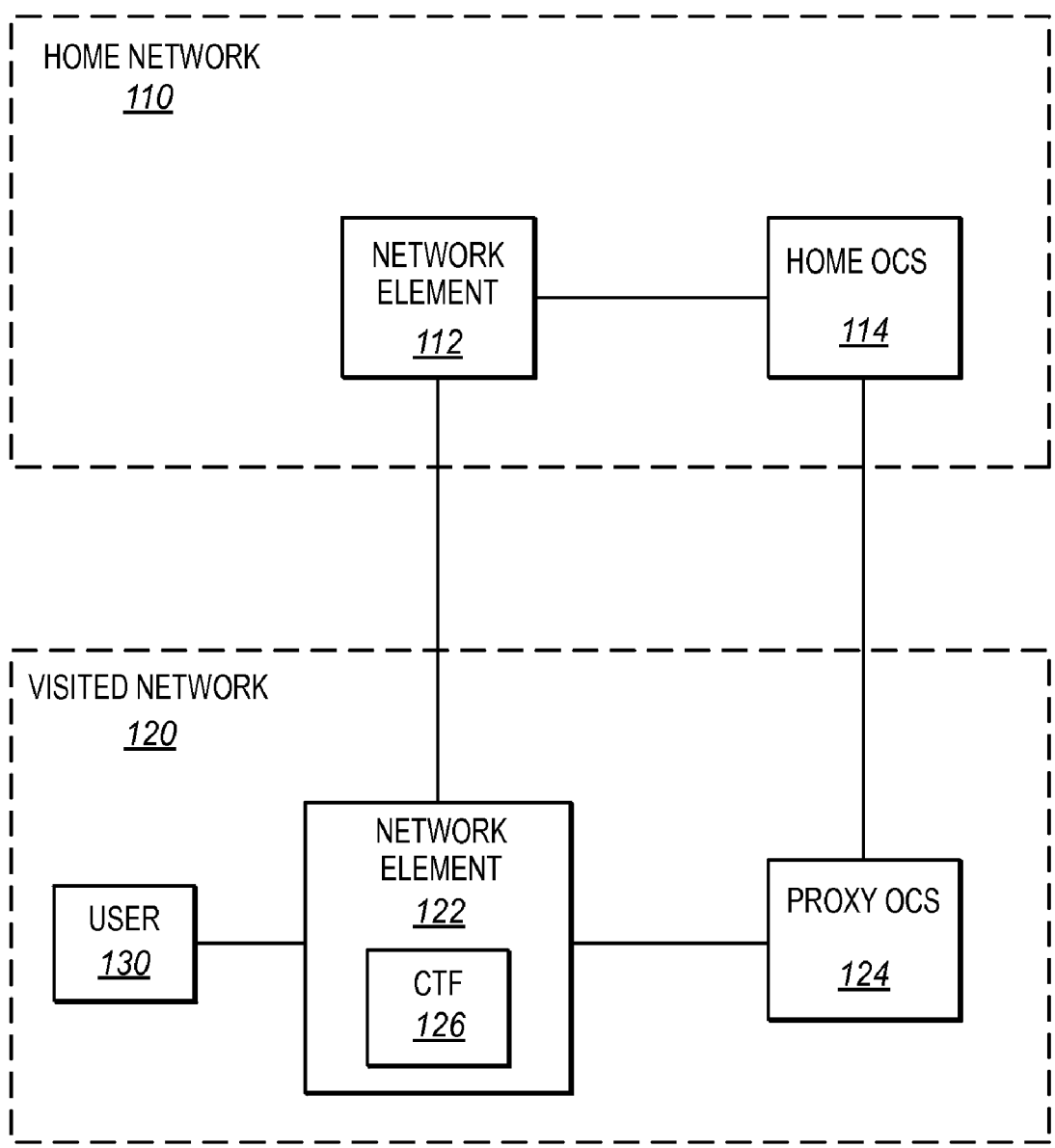
FIG. 1 illustrates a communication network in an exemplary embodiment of the invention.

FIG. 1 illustrates a communication network 100 in an exemplary embodiment of the invention. Communication network 100 comprises an LTE/EPC network. Communication network 100 includes an LTE/EPC home network 110 and an LTE/EPC visited network 120. Home network 110 comprises the network where service is registered or subscribed to by a particular user, such as user 130. Home network 110 may be a packet network, a circuit-switched network, an IMS network, or another type of 3GPP network. Home network 110 includes a home network element 112, which comprises any system, server, or function adapted to provide session control or provide a service for a session in home network 110. An example of network element 112 includes a 3GPP AAA server.

Visited network 120 comprises a network where service is not registered or subscribed to by user 130 but is extending service to user 130 while the user 130 is roaming. Visited network 120 may be a packet network, a circuit-switched network, an IMS network, or another type of 3GPP network or non-3GPP network. Visited network 120 includes a visited network element 122, which comprises any system, server, or function adapted to provide session control or provide a service for a session in visited network 120. Examples of network element 122 include a serving gateway (SGW), a Packet Data Network gateway (PDN-GW), a HRPD Serving gateway (HSGW), or a 3GPP AAA proxy server.

Embodiments provided herein introduce a new online charging architecture for LTE/EPC networks. For the charging architecture, home network 110 includes a home OCS 114. Home OCS 114 comprises any system, server, or function adapted to perform online charging for sessions in home network 110. Visited network 120 includes a proxy OCS 124. Proxy OCS 124 comprises any system, server, or function adapted to perform credit control for roaming sessions in visited network 120. Credit control is a mechanism that directly interacts in real-time with an account of a user and controls or monitors the charges related to the service usage. Credit control is a process of checking whether credit is available, credit-reservation, the deduction of credit from the end user account (or an allotment granted from the end user account) when service is completed, and refunding of reserved credit that is not used. Proxy OCS 124 may be implemented in a visited OCS (not shown) of visited network 120. Alternatively, proxy OCS 124 may be implemented in another network element in visited network 120.

In this embodiment, assume that user 130 registers or subscribes to service with home network 110, but is roaming in visited network 120. User 130 has a properly-equipped communication device or user equipment (UE) for communication. Also assume that user 130 initiates or is invited into a session while roaming in visited network 120. For the session, network element 122 (and possibly other network elements in visited network 120 that are not shown for the sake of brevity) is requested to provide a service to user 130 for the session. Network element 122 includes a Charging Trigger Function (CTF) 126 that is operable to identify the service being requested. Because user 130 has subscribed to online charging (prepaid), network element 122 needs permission before providing the service. Thus, the CTF 126 in network element 122 transmits a credit request message to proxy OCS 124 with the appropriate request for authorization of the service and for a quota of service units for budget control. In this embodiment, proxy OCS 124 provides real-time credit control for the session as follows.

FIG. 2 is a flow chart illustrating a method 200 of performing credit control in visited network 120 in an exemplary embodiment of the invention. The steps of method 200 will be described with reference to communication network 100 in FIG. 1, although method 200 may be performed by other communication networks. The steps of the flow chart in FIG. 2 are not all inclusive and may include other steps not shown.

In step 202, proxy OCS 124 transmits an online charging request message to home OCS 114 in home network 110. Because proxy OCS 124 is not in the home network 110 for roaming user 130, proxy OCS 124 does not have a subscriber profile (or charging profile) for user 130. Also, proxy OCS 124 does not maintain an account balance for user 130. Thus, the online charging request message from proxy OCS 124 requests the appropriate charging information for roaming user 130 from home OCS 114. Home OCS 114 then operates as described in FIG. 3.

FIG. 3 is a flow chart illustrating a method 300 of providing charging information to proxy OCS 124 in an exemplary embodiment of the invention. In step 302, home OCS 114 receives the online charging request message from proxy OCS 124 for the session. In step 304, home OCS 114 identifies the roaming user 130 involved in the session responsive to receiving the online charging request message. In step 306, home OCS 114 identifies charging information for roaming user 130 as requested by proxy OCS 124. The charging information comprises any information or data that proxy OCS 124 may need to perform real-time credit control. For example, the charging information may include a class of service or service plan subscribed to by user 130 so that proxy OCS 124 may assign a rating for the session. Proxy OCS 124 most likely does not need the entire subscriber profile (or charging profile) for user 130 in order to assign a rating for the session, thus home OCS 114 may avoid including the entire subscriber profile for user 130 in the charging information. The charging information may also include an allotment of service units granted by home OCS 114 for a session in visited network 120. In step 308, home OCS 114 inserts the charging information for roaming user 130 in an online charging response message. Home OCS 114 then transmits the online charging response message to proxy OCS 124 in step 310.

In FIG. 2, proxy OCS 124 receives the online charging response message from home OCS 114 that includes the charging information for roaming user 130 in step 204. In step 206, proxy OCS 124 processes the charging information to perform real-time credit control for one or more network elements 122 in visited network 120 that is serving the session. For example, responsive to the credit request message previously received from network element 122, proxy OCS 124 may grant a quota of service units to network element 122 based on the charging information received from home OCS 114. Network element 122 may then provide the service after being granted the quota.

Figure 4:
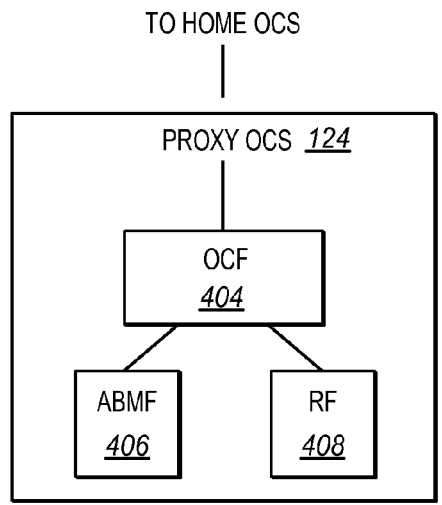
FIG. 4 is a block diagram illustrating a proxy OCS in an exemplary embodiment of the invention.

FIG. 4 is a block diagram illustrating proxy OCS 124 in an exemplary embodiment of the invention. In this embodiment, proxy OCS 124 includes an online charging function (OCF) 404, an Account Balance Management Function (ABMF) 406, and a rating function (RF) 408. OCF 404 comprises any system, server, or function operable to manage online charging in proxy OCS 124 by accessing ABMF 406 and RF 408. ABMF 406 comprises any system, server, or function operable to maintain an allotment of service units that was granted by home OCS 114. RF 408 comprises any system, server, or function operable to determine a rating for a session or service in visited network 120 based on a tariff defined by the network operator.

In order to provide real-time credit control for a session of roaming user 130 in visited network 120 (see FIG. 1), OCF 404 first needs to obtain the charging information for user 130. To obtain the charging information, OCF 404 generates an online charging request message that requests the needed charging information. The charging information that is needed may vary depending on desired implementations. However, it is preferable to request a minimum of charging information as opposed to obtaining the entire subscriber profile of user 130. OCF 404 then transmits the online charging request message to home OCS 114 in home network 110. Home OCS 114 then operates as follows responsive to receiving the online charging request message.

Figure 5:
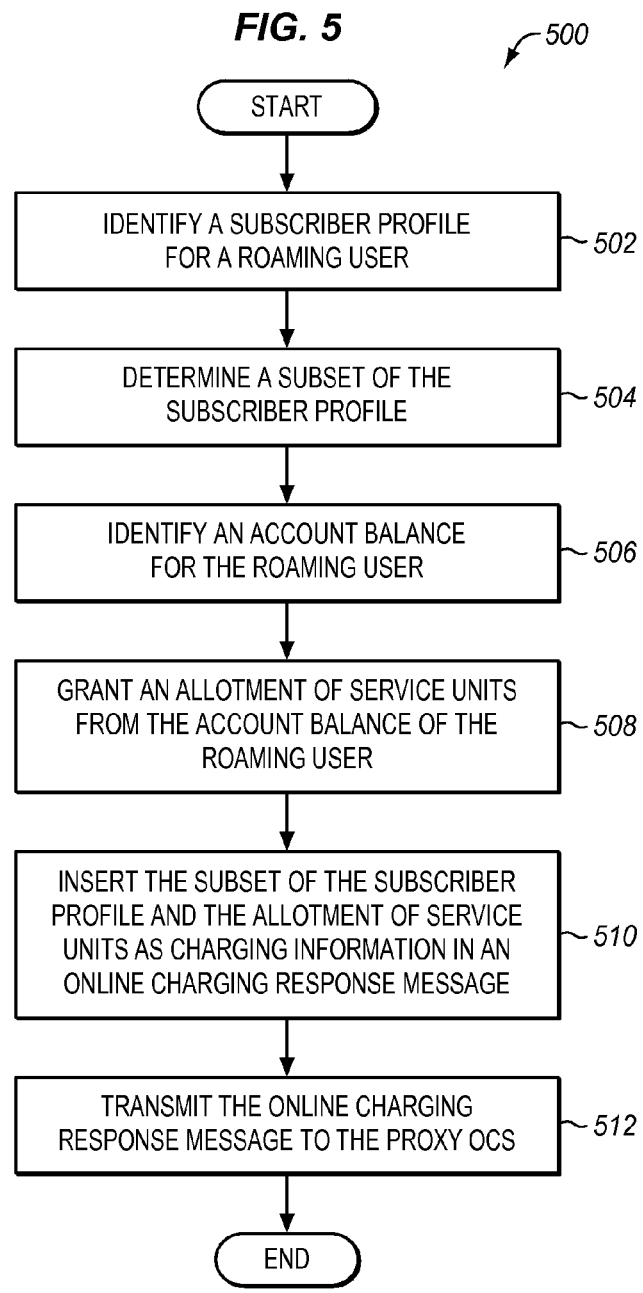
FIG. 5 is a flow chart illustrating a method of providing charging information to a proxy OCS in an exemplary embodiment of the invention.

FIG. 5 is a flow chart illustrating a method 500 of providing charging information to proxy OCS 124 in an exemplary embodiment of the invention. In step 502, home OCS 114 identifies a subscriber profile for user 130. The subscriber profile (also referred to as a charging profile or charging rules) indicates a service plan that user 130 has subscribed to, indicates a class of service for user 130, and other relevant charging information. In step 504, home OCS 114 determines a subset of the subscriber profile of user 130. The subset of the subscriber profile represents the information that home OCS 114 determines is needed or desired by proxy OCS 124 in order to determine a rating or perform credit control per an agreement between network operators.

In step 506, home OCS 114 identifies an account balance for roaming user 130. The account balance is typically maintained in an Account Balance Management Function (ABMF) in home OCS 114. The account balance represents the amount of money or other service units that user 130 has purchased in advance for the prepaid service. In step 508, home OCS 114 grants an allotment of service units from the account balance for roaming user 130 for the session in visited network 120. The allotment of service units may represent the entire balance in the account of user 130. However, the allotment may represent a portion of the account balance.

For example, if user 130 has a balance of 200 service units, then home OCS 114 may allocate 50 service units for the session in visited network 120. In step 510, home OCS 114 inserts the subset of the subscriber profile and the allotment of service units as charging information in an online charging response message. Home OCS 114 then transmits the online charging response message to proxy OCS 124 in step 512.

Figure 6:
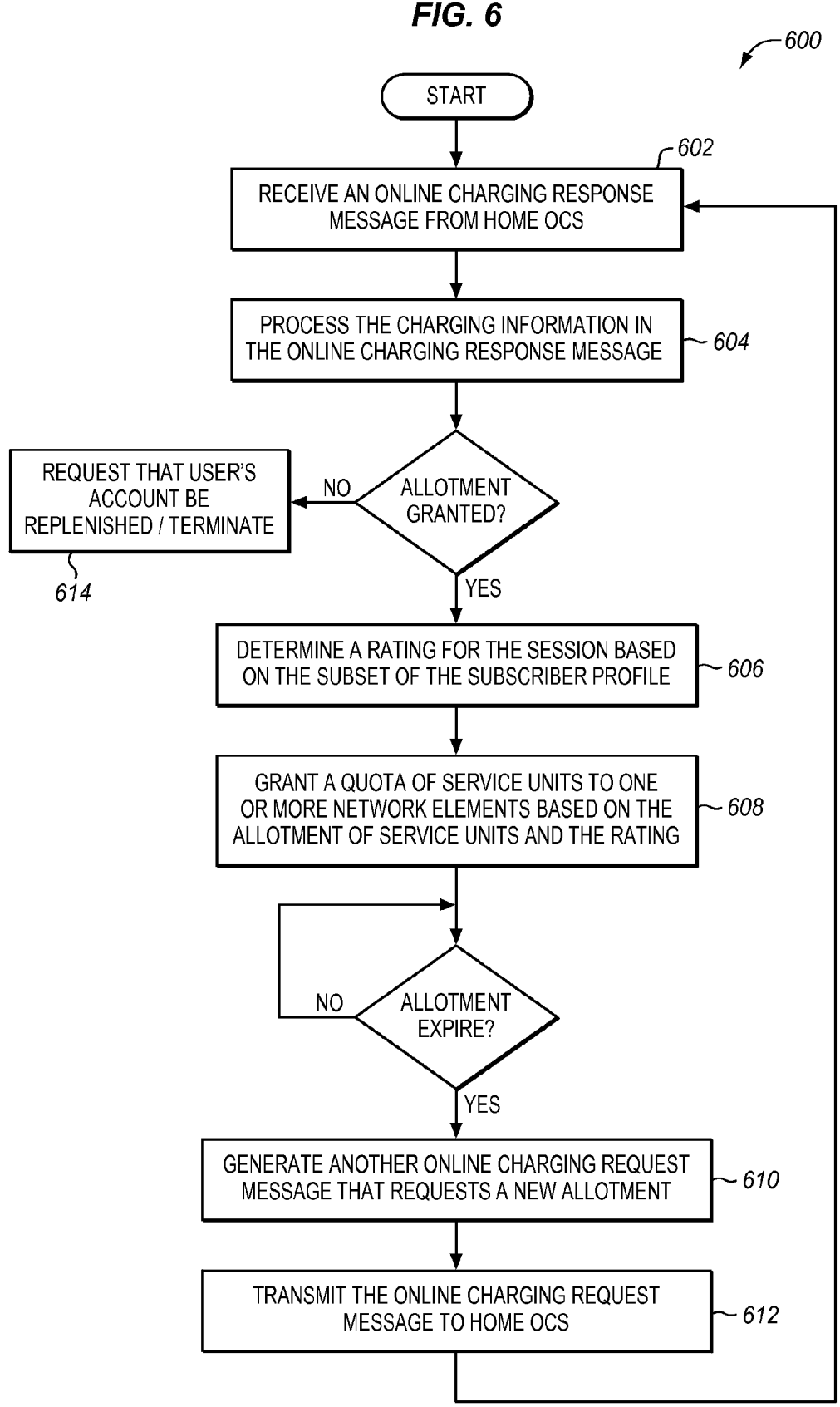
FIG. 6 is a flow chart illustrating a method of performing credit control in a proxy OCS in an exemplary embodiment of the invention.

FIG. 6 is a flow chart illustrating a method 600 of performing credit control in proxy OCS 124 in an exemplary embodiment of the invention. In step 602, OCF 404 receives the online charging response message from home OCS 114. In step 604, OCF 404 processes the charging information in the online charging response message to identify the allotment of service units granted by home OCS 114 (if any) and the subset of the subscriber profile. OCF 404 may store the allotment of service units in ABMF 406. In step 606, rating function 408 determines a rating for the session based on the subset of the subscriber profile provided by home OCS 114. For instance, the subset of the subscriber profile may indicate a tariff that is applied to roaming sessions for user 130.

In step 608, OCF 404 grants a quota of service units to network element 122 (or other network elements serving the session) in visited network 120 based on the allotment of service units, the rating, and the service and data types. For example, assume that network element 122 transmits a credit request message to proxy OCS 124 for a service that network element 122 is to provide for the session. Responsive to the credit request message (e.g., a Diameter Credit Control Request (CCR) message), OCF 404 grants a quota of service units from the allotment that was granted by home OCS 114. OCF 404 then transmits a credit response message (e.g., a Diameter Credit Control Answer (CCA) message) to network element 122 indicating the quota granted to network element 122. CTF 126 in network element 122 may then provide budget control based on the granted quota.

As OCF 404 provides credit control for network element 122 and other network elements, ABMF 406 monitors the allotment of service units. If the allotment of service units expires, then OCF 404 generates another online charging request message that requests a new allotment of service units in step 610. In step 612, OCF 404 transmits the online charging request message to home OCS 114. If there is a sufficient account balance for user 130, then home OCS 114 may grant another allotment of service units in response to the online charging request message.

In step 602, OCF 404 receives another online charging response message from home OCS 114. In step 604, OCF 404 processes the charging information inserted in the online charging response message to identify if a new allotment of service units was granted by home OCS 114. If a new allotment was granted, then OCF 404 performs credit control based on the new allotment. For example, OCF 404 may determine a rating for the session and grant new quotas of service units to network element 122 or other network elements based on the new allotment. If a new allotment was not granted, then OCF 404 may request that user 130 replenish his/her account in home OCS 114 or may terminate the session in step 614.

Proxy OCS 124 as shown in FIG. 4 may store or cache the subset of the subscriber profile for roaming user 130 as received from home OCS 114. However, when the session terminates and proxy OCS 124 writes session data into a CDR, proxy OCS 124 may erase the subset of the subscriber profile for roaming user 130 in the cache per agreement between network operators of home network 110 and visited network 120.

As an alternative to proxy OCS 124 performing credit control, when the inter-networks is secure between home network 110 and visited network 120 and there is agreement between network operators, proxy OCS 124 may function as a Diameter Ro proxy toward home OCS 114. For instance, proxy OCS 124 may pass a Diameter CCR message to home OCS 114 and receive a Diameter CCA message from home OCS 114. Home OCS 114 performs subscriber account management, rating, and credit control for the session in visited network 120. Proxy OCS 124 then passes CCA data to network elements 122 in visited network 120.

The interface protocol between proxy OCS 124 and home OCS 114 may be a new interface not defined in the standards. 3GPP TS 32.296 mentions a reference point Rc between EBCF/SBCF and ABMF to exchange subscriber account data. However, the 3GPP does not define the Rc reference point. In practice, the Rc reference point has been implemented as an internal API within the OCS for call control interfaces with the subscriber database. According to the embodiment described below, because proxy OCS 124 interfaces with home OCS 114 to obtain subscriber profile information, a new protocol is defined to carry this information. The new protocol is referred to as an enhanced Diameter Rc' protocol.

An enhanced Diameter Rc' protocol may be utilized for proxy OCS 124 requesting the subscriber profile information for roaming user 130 and home OCS 114 responding with the subscriber profile information. The Rc' request and response messages may carry limited subscriber profile information based on the agreement between the network operators. For example, the Rc' request message should allow proxy OCS 124 to include the following data: Subscriber data (e.g., a subscriber ID, access information, or location information), service data, media data types, timestamps, involved network element information, and requested estimated allotment of service units. The Rc' response message should allow home OCS 114 to include the following data: Subscriber data, allowed class of services or service plan for charging, allowed media types, granted allotment of service units, no balance/low balance indications, and recharging indication.

EXAMPLE

Figure 7:
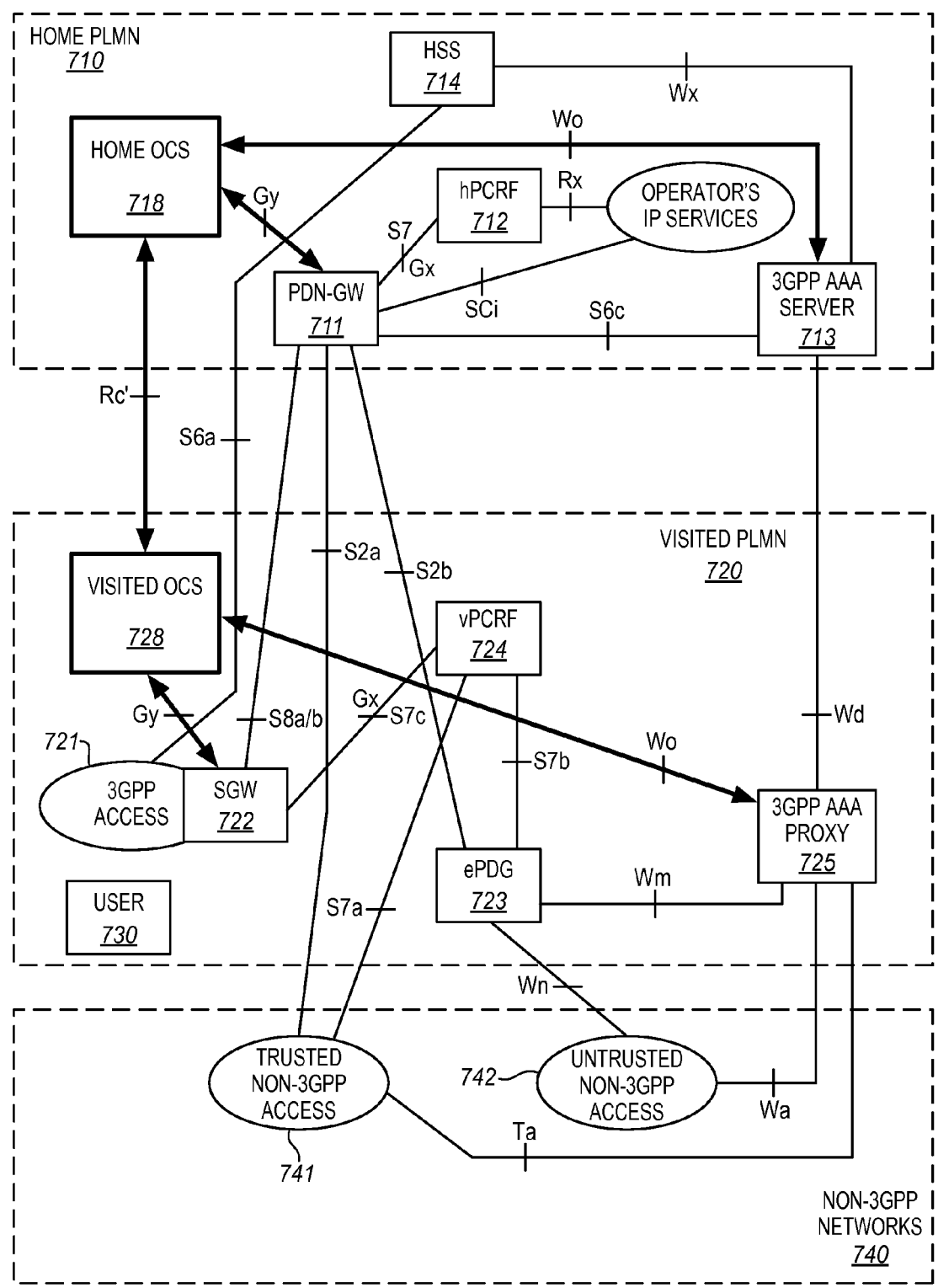
FIG. 7 illustrates an LTE/EPC communication network in an exemplary embodiment of the invention.
Figure 8:
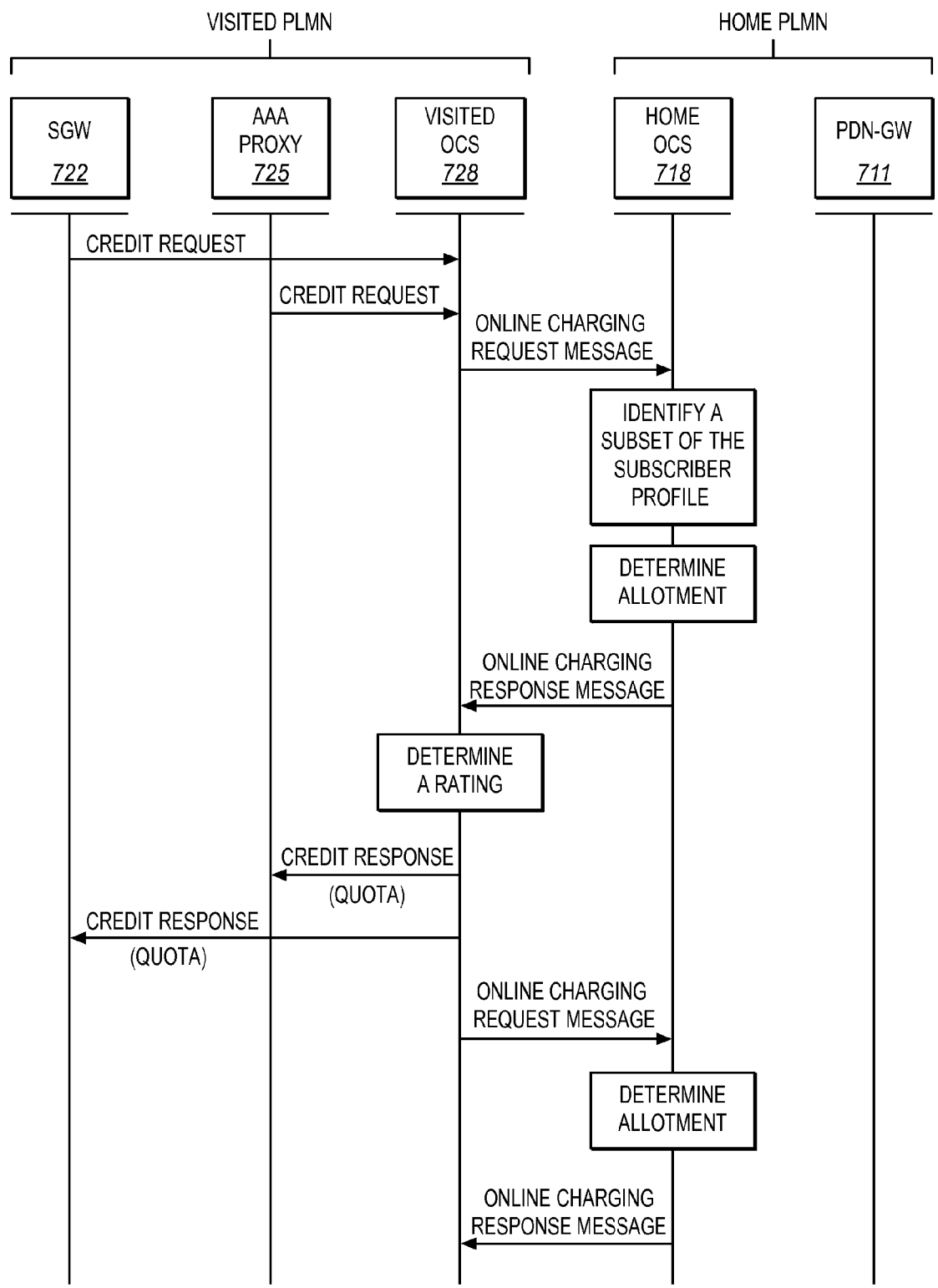
FIG. 8 is a message diagram illustrating credit control being performed in a visited PLMN in an exemplary embodiment of the invention.

FIGS. 7-8 illustrate an example of an LTE/EPC communication network implementing the improved charging architecture. FIG. 7 illustrates an LTE/EPC communication network 700 in an exemplary embodiment of the invention. Communication network 700 includes a home Public Land Mobile Network (PLMN) 710, a visited PLMN 720, and one or more non-3GPP networks 740. Home PLMN 710 comprises the network where service is registered or subscribed to by a particular user, such as user 730. Home PLMN 710 includes a PDN-GW 711, a Home Policy and Charging Rules Function (hPCRF) 712, a 3GPP AAA server 713, and a Home Subscriber Server (HSS) 714.

Visited PLMN 720 comprises a network where service is not registered or subscribed to by user 730 but is extending service to user 730 while roaming. Visited PLMN 720 includes a 3GPP access network 721, a SGW 722, a Packet Data Gateway (ePDG) 723, a Visited PCRF (vPCRF) 724, and a 3GPP AAA proxy server 725. Non-3GPP network 740 includes a trusted non-3GPP access network 741 and an untrusted non-3GPP access network 742.

Communication network 700 resembles the architecture suggested by the 3GPP in TS 32.820 in terms of the network elements and the Diameter interfaces used between the network elements. However, this embodiment introduces a new online charging architecture for LTE/EPC networks. For the charging architecture, home PLMN 710 includes a home OCS 718. Home OCS 718 comprises any system, server, or function adapted to perform online charging for sessions in home PLMN 710. Visited PLMN 720 includes a visited OCS 728. Visited OCS 728 represents a proxy OCS that performs credit control for roaming sessions in visited PLMN 720. Home OCS 718 communicates with visited OCS 728 over the enhanced Diameter Rc' interface. In home PLMN 710, 3GPP AAA server 713 communicates with home OCS 718 over the Diameter Wo interface, and PDN-GW 711 communicates with home OCS 718 over the Diameter Gy interface. In visited PLMN 720, 3GPP AAA proxy server 725 communicates with visited OCS 728 over the Diameter Wo interface, and SGW 722 communicates with visited OCS 728 over the Diameter Gy interface.

In visited PLMN 720, AAA proxy 725 will support session-based charging via Wo protocol toward the visited OCS 728. The Wo reference point is used by 3GPP AAA proxy server 725 to communicate with visited OCS 728. The prime purpose of the protocol(s) crossing this reference point is to transport online charging related information so as to perform credit control for sessions involving user 730. SGW 722 and PDN-GW 711 will interface with vPCRF 724 via the Gx reference point as defined by TS 23.203 and 32.240. The Gx reference point enables a PCRF to have dynamic control over the PCC behavior at a PCEF.

SGW 722 and PDN-GW 711 will interface with visited OCS 728 and home OCS 718 via the Gy reference point as defined TS 23.203 and 32.240. The Gy reference point allows online credit control for service data flow based charging. The functionalities required across the Gy reference point use existing functionalities and mechanisms based on RFC 4006.

In support of LTE/EPC online charging, SGW 722 and PDN-GW 711 collect charging information for PCRF 712, 724, home OCS 718, and visited OCS 728. SGW 722 charging is billed by the following types: Time-based billing, volume-based billing, and event-based billing. LTE and CDMA charging is billed per transaction as user per IMSI, and QoS Class Indicator (QCI) (i.e., a new record is created for each QoS flow or QoS change).

To provide these types of billing, SGW 722 may collect charging information as described below. The charging information collected may include the usage of the radio interface. The charging information for usage of the radio interface describes the amount of data transmitted in Mobile Originated (MO) and Mobile Terminated (MT) directions categorized with QoS and user protocols. The charging information collected may include the usage duration. The charging information for duration usage describes the duration of PDP context over the time interval from PDP context activation to PDP context deactivation. The charging information collected may include usage of the general PS domain resources. The charging information for usage of the general PS domain resources describes the usage of other PS domain-related resources and the PS domain network activity (e.g. mobility management). The charging information collected may include the destination and source, which describes the actual source addresses used by the user for the PDP context, and describes the destination addresses with a level of accuracy as determined by the Access Point Name (APN). The charging information collected may include the location of the roaming user, home PLMN, visited PLMN, plus optional higher-accuracy location information.

PDN-GW 711 charging is billed by the following types: Time-based billing, volume-based billing, and event-based billing. LTE and CDMA charging is billed per transaction based on user per IMSI, QoS Class Indicator (QCI), flow (i.e., flow based charging with IP address and UDP port), application type (i.e., call forwarding, 411 call, SMS, location service and quantity of file downloads or actual video streaming play time), content type (i.e., messaging, e-mail, application download, game session, etc), protocol type (i.e., FTP, RTP, RSTP, Video, etc), and destination server (IP address or TCP/UDP port). The interface between SGW 722 and PDN-GW 711 may be PMIP. PDN-GW 711 collects PMIP based charging records in PDN-GW CDR which can be enhanced from PDSN User Data Record or UDR (for IP network part) and Flow Data Record or FDR.

PDN-GW 711 may collect the following charging information to provide online charging. The charging information collected may include usage of the PMIP or GTP tunnel. The charging information for usage of the PMIP or GTP tunnel describes the amount of data transmitted in MO and MT directions categorized with QoS and user protocols. The charging information collected may include usage duration. The charging information for usage duration describes the duration of PMIP or GTP tunnel from tunnel activation to tunnel deactivation. The charging information collected may include usage of the external data networks. The charging information for usage of external data networks describes the amount of data sent to and received from the external data network. The external networks may be identified by the Access Point Name (APN).

When flow-based charging is supported within session-based charging, a flow ID is used to identify the service flow(s). Additional FBC information is collected in PDN-GW 711 as follows. The amount of data transmitted in MO and MT directions is collected and categorized by the rating group or combination of the rating group and service ID when volume-based charging applies. The duration of service data flows is collected and categorized by the rating group or combination of the rating group and service ID when time-based charging applies. The amount of events and corresponding timestamps are collected and categorized by the rating group or combination of the rating group and service ID when event-based charging applies.

Additional charging related actions may be supported in PDN-GW 711. PDN-GW 711 may deny the service. For example, PDN-GW 711 may deny the packet from a list of denied destination servers. PDN-GW 711 may be capable of mid session control for prepaid or subscription service with redirection capabilities. For example, PDN-GW 711 may redirect a session to a payment center if there is billing issue for this user or charging balance. PDN-GW 711 may provide Advise of Charging (AoC) if present balance is below a minimum threshold.

In this embodiment, assume that user 730 registers or subscribes to service with home PLMN 710, but is roaming in visited PLMN 720. User 730 has a properly-equipped communication device or user equipment (UE) for communication. Also assume that user 730 initiates or is invited into a session while roaming in visited PLMN 720. For the session, SGW 722, AAA proxy 725, and/or other network elements in visited PLMN 720 is requested to provide a service to user 730 for the session. Because user 730 has subscribed to online charging (prepaid), SGW 722, AAA proxy 725, and/or other network elements need permission before providing the service.

FIG. 8 is a message diagram illustrating the credit control being performed in visited PLMN in an exemplary embodiment of the invention. The message diagram illustrates Diameter messaging used within communication network 700. Assume that SGW 722 and AAA proxy 725 are involved in a session for roaming user 730. SGW 722 and AAA proxy 725 each transmit a credit request message to visited OCS 728 with the appropriate request for authorization of the service and for service units for credit control.

Visited OCS 728 transmits an online charging request message to home OCS 718. Because visited OCS 728 is not in the home PLMN 710 for roaming user 730, visited OCS 728 does not have a subscriber profile (or charging profile) for user 730. Also, visited OCS 728 does not maintain an account balance for user 730. Thus, the online charging request message from visited OCS 728 requests the appropriate charging information for roaming user 730 from home OCS 718.

Responsive to receiving the online charging request message, home OCS 718 identifies the roaming user 730 involved in the session and identifies the subscriber profile for user 730. Because home OCS 718 does not want to provide the entire subscriber profile of user 730 to visited OCS 728, home OCS 718 identifies a subset of the subscriber profile that visited OCS 728 may need to determine a rating and to perform credit control. Home OCS 718 also determines an allotment of service units to grant to visited OCS 728 for credit control. To determine the allotment, home OCS 718 identifies an account balance for roaming user 730. The account balance represents the amount of money or other service units that user 730 has purchased in advance for the prepaid service. Home OCS 718 grants an allotment of service units from the account balance for roaming user 730, which may represent the entire balance in the account of user 730 or may represent a portion of the account balance. Home OCS 718 inserts the subset of the subscriber profile and the allotment of service units as charging information in an online charging response message. Home OCS 718 then transmits the online charging response message to visited OCS 728.

Visited OCS 728 then processes the charging information in the online charging response message to identify the allotment of service units granted by home OCS 718 (if any) and the subset of the subscriber profile. Visited OCS 728 determines a rating for the session based on the subset of the subscriber profile provided by home OCS 718. For instance, the subset of the subscriber profile may indicate a tariff that is applied to roaming sessions for user 730. Visited OCS 728 then grants a quota of service units to SGW 722 and AAA proxy 725 based on the allotment of service units, the rating, and the service and data types. Visited OCS 728 transmits credit response messages to SGW 722 and AAA proxy 725 indicating the quota granted to SGW 722 and AAA proxy 725, respectively. SGW 722 and AAA proxy 725 may then provide budget control based on the granted quota.

As visited OCS 728 provides credit control, visited OCS 728 also monitors the allotment of service units. If the allotment of service units expires, then visited OCS 728 generates another online charging request message that requests a new allotment of service units. If there is a sufficient account balance for user 130, then home OCS 114 may grant another allotment of service units in an online charging response message.

Although specific embodiments were described herein, the scope of the invention is not limited to those specific embodiments. The scope of the invention is defined by the following claims and any equivalents thereof.

We claim:

1. A system comprising:
   a proxy online charging system (OCS) implemented in a visited network that provides service to a roaming user for a session;
   the proxy OCS operable to transmit an online charging request to a home OCS in a home network for the roaming user, to receive an online charging response from the home OCS that includes charging information for the roaming user, to process the charging information to identify an allotment of service units granted by the home OCS, to determine a rating for the session, and to grant a quota of service units to at least one network element in the visited network based on the allotment of service units and the rating.

2. The system of claim 1 wherein:
   if the allotment of service units expires, then the proxy OCS is further operable to transmit another online charging request to the home OCS requesting a new allotment of service units, to receive another online charging response from the home OCS, to process the other online charging response to determine if the new allotment of service units was granted by the home OCS, and to grant another quota of service units to the at least one network element in the visited network based on the new allotment of service units if the new allotment of service units was granted.

3. The system of claim 1 wherein the online charging request and the online charging response comprise enhanced Diameter Rc messages.

4. The system of claim 1 further comprising:
   the home OCS operable to receive the online charging request from the proxy OCS, to identify the roaming user responsive to receiving the online charging request, to identify the charging information for the roaming user, to insert the charging information for the roaming user in the online charging response, and to transmit the online charging response to the proxy OCS.

5. The system of claim 4 wherein:
   the home OCS is further operable to identify an account balance for the roaming user, to grant an allotment of service units from the account balance for the visited network, and to insert the allotment of service units in the online charging response.

6. The system of claim 4 wherein:
   the home OCS is further operable to identify a subscriber profile for the roaming user, to determine a subset of the subscriber profile for use by the proxy OCS for performing credit control in the visited network, and to insert the subset of the subscriber profile in the online charging response.

7. The system of claim 6 wherein:
   the proxy OCS is further operable to store the subset of the subscriber profile during the session of the roaming user, and to erase the subset of the subscriber profile at the end of the session.

8. A method of performing credit control in a visited network for a session of a roaming user, the method comprising:
   transmitting an online charging request from a proxy online charging system (OCS) in the visited network to a home OCS in a home network for the roaming user;
   receiving an online charging response in the proxy OCS from the home OCS that includes charging information for the roaming user;
   processing the charging information to identify an allotment of service units granted by the home OCS;
   determining a rating for the session; and
   granting a quota of service units to at least one network element in the visited network based on the allotment of service units and the rating.

9. The method of claim 8 further comprising:
   if the allotment of service units expires, then:
      transmitting another online charging request to the home OCS requesting a new allotment of service units;

receiving another online charging response from the home OCS;

processing the other online charging response to determine if the new allotment of service units was granted by the home OCS; and granting another quota of service units to the at least one network element in the visited network based on the new allotment of service units if the new allotment of service units was granted.

10. The method of claim 8 wherein the online charging request and the online charging response comprise enhanced Diameter Rc messages.

11. The method of claim 8 further comprising:

receiving the online charging request in the home OCS from the proxy OCS;

identifying the roaming user responsive to receiving the online charging request;

identifying the charging information for the roaming user;

inserting the charging information for the roaming user in the online charging response; and transmitting the online charging response from the home OCS to the proxy OCS.

12. The method of claim 11 wherein identifying the charging information for the roaming user comprises:

identifying an account balance for the roaming user; and granting an allotment of service units from the account balance for the visited network.

13. The method of claim 11 wherein identifying the charging information for the roaming user comprises:

identifying a subscriber profile for the roaming user; and determining a subset of the subscriber profile for use by the proxy OCS for performing credit control in the visited network.

14. The method of claim 13 further comprising:

storing the subset of the subscriber profile in the proxy OCS during the session of the roaming user; and erasing the subset of the subscriber profile from the proxy OCS at the end of the session.

15. A Long Term Evolution/Evolved Packet Core (LTE/EPC) communication network, comprising:

a home network for a user; and a visited network operable to provide service to the user for a session when the user is roaming, the visited network including a proxy online charging system (OCS) operable to transmit an online charging request to a home OCS in the home network, to receive an online charging response from the home OCS that includes the charging information for the roaming user, to process the charging information to identify an allotment of service units granted by the home OCS, to process the charging information to determine a rating for the session, and to grant a quota of service units to at least one network element in the visited network based on the allotment of service units and the rating.

16. The LTE/EPC communication network of claim 15 wherein:

if the allotment of service units expires, then the proxy OCS is further operable to transmit another online charging request to the home OCS requesting a new allotment of service units, to receive another online charging response from the home OCS, to process the other online charging response to determine if the new allotment of service units was granted by the home OCS, and to grant another quota of service units to the at least one network element in the visited network based on the new allotment of service units if the new allotment of service units was granted.

17. The LTE/EPC communication network of claim 15 wherein:

the home OCS is operable to receive the online charging request from the proxy OCS, to identify the roaming user responsive to receiving the online charging request, to identify an account balance for the roaming user, to grant the allotment of service units from the account balance for the visited network, to insert the allotment of service units in the online charging response, and to transmit the online charging response to the proxy OCS.

18. The LTE/EPC communication network of claim 17 wherein:

the home OCS is further operable to identify a subscriber profile for the roaming user, to determine a subset of the subscriber profile for use by the proxy OCS for performing credit control in the visited network, and to insert the subset of the subscriber profile in the online charging response.

* * * * *